US009479033B2

(12) United States Patent
Ponzio et al.

(10) Patent No.: US 9,479,033 B2
(45) Date of Patent: Oct. 25, 2016

(54) APPARATUS AND METHOD FOR MANUFACTURING COIL MEMBERS FOR CORES OF DYNAMO ELECTRIC MACHINES BY BENDING

(75) Inventors: Massimo Ponzio, Tavernelle Val di Pesa (IT); Rubino Corbinelli, Staggia Senese (IT); Maurizio Mugelli, San Gimignano (IT)

(73) Assignee: ATOP S.p.A., Barberino Val d'Elsa (IT)

( * ) Notice: Subject to any disclaimer, the term of this patent is extended or adjusted under 35 U.S.C. 154(b) by 176 days.

(21) Appl. No.: 14/118,171

(22) PCT Filed: May 14, 2012

(86) PCT No.: PCT/EP2012/002055
§ 371 (c)(1),
(2), (4) Date: Nov. 15, 2013

(87) PCT Pub. No.: WO2012/156066
PCT Pub. Date: Nov. 22, 2012

(65) Prior Publication Data
US 2014/0090240 A1    Apr. 3, 2014

(30) Foreign Application Priority Data

May 16, 2011 (IT) .............................. TO2011A0435

(51) Int. Cl.
*H02K 15/00* (2006.01)
*H02K 15/04* (2006.01)
*H02K 15/08* (2006.01)

(52) U.S. Cl.
CPC .......... *H02K 15/04* (2013.01); *H02K 15/0421* (2013.01); *H02K 15/0478* (2013.01); *H02K 15/08* (2013.01); *Y10T 29/53161* (2015.01)

(58) Field of Classification Search
CPC .......... H02K 15/095; Y10T 29/53161; Y10T 29/49009
See application file for complete search history.

(56) References Cited

U.S. PATENT DOCUMENTS

| | | | | |
|---|---|---|---|---|
| 4,052,783 A | * | 10/1977 | Shively | H02K 15/09 242/433.3 |
| 5,586,384 A | * | 12/1996 | Newman | H02K 15/0056 29/564.6 |
| 6,782,600 B2 | * | 8/2004 | Yamazaki | H02K 15/09 242/433.3 |

(Continued)

FOREIGN PATENT DOCUMENTS

| | | |
|---|---|---|
| EP | 1 041 702 A2 | 10/2000 |
| EP | 1 043 828 A2 | 10/2000 |

(Continued)

OTHER PUBLICATIONS

International Search Report of PCT/EP2012/002055 issued on Jan. 23, 2013.
Search Report and Written Opinion, completed Nov. 8, 2011, for IT TO2011A000199.

(Continued)

*Primary Examiner* — Minh Trinh
(74) *Attorney, Agent, or Firm* — Cooley LLP

(57) ABSTRACT

Apparatuses and method for manufacturing coil members (230, 250) for insertion in slots of a core of an electric dynamo machine, wherein the coil members (230, 250) are formed by bending portions of an electric conductor (10). Portions of conductor of a predetermined length are fed through an aperture (80), where at least one engagement member (51) can move to engage and bend the conductor (10) so as to form the configuration of the coil member (230, 250).

8 Claims, 8 Drawing Sheets

(56) References Cited

U.S. PATENT DOCUMENTS

| | | | |
|---|---|---|---|
| 7,370,401 B2 * | 5/2008 | Stratico | H02K 15/0056 242/433 |
| 2002/0017585 A1 * | 2/2002 | Haruta | H02K 15/095 242/433.3 |
| 2003/0137207 A1 | 7/2003 | Tamura et al. | |
| 2003/0159270 A1 | 8/2003 | Kato | |
| 2003/0233748 A1 | 12/2003 | Gorohata et al. | |
| 2004/0040142 A1 * | 3/2004 | Hirota | H02K 3/12 29/596 |
| 2005/0236509 A1 * | 10/2005 | Burch | H02K 15/095 242/432.4 |
| 2008/0148794 A1 * | 6/2008 | Patterson | H02K 15/026 72/130 |
| 2009/0249853 A1 | 10/2009 | Young et al. | |
| 2010/0325875 A1 * | 12/2010 | Ponzio | H02K 15/095 29/596 |

FOREIGN PATENT DOCUMENTS

| | | |
|---|---|---|
| EP | 1328059 A2 | 7/2003 |
| EP | 1376816 A2 | 1/2004 |
| EP | 1727260 A2 | 11/2006 |
| EP | 1 043 828 B1 | 9/2009 |
| FR | 2 845 536 A1 | 4/2004 |
| GB | 1 496 445 A | 12/1977 |
| WO | WO 2013/190860 A1 | 12/2013 |

OTHER PUBLICATIONS

Search Report and Written Opinion, completed Feb. 2, 2012, for IT TO2011A000435.

International Search Report and Written Opinion, mailed Apr. 5, 2012, for International Application No. PCT/EP2012/000633.

International Preliminary Report on Patentability, mailed Sep. 19, 2013, for International Application No. PCT/EP2012/000633.

* cited by examiner

180
APPARATUS AND METHOD FOR MANUFACTURING COIL MEMBERS FOR CORES OF DYNAMO ELECTRIC MACHINES BY BENDING

CROSS-REFERENCE TO RELATED APPLICATIONS

The present application is a 35 U.S.C. §371 national stage entry of PCT/EP2012/002055, international filing date of May 14, 2012, which claims benefit of Italian application no. TO2011A000435, filed May 16, 2011, both disclosures of which are incorporated herein by reference in their entireties.

BACKGROUND OF THE INVENTION

The present invention relates to apparatuses and processes adapted to produce coil members having a fork-like shape, or different shapes, by bending at least one electric conductor.

Once formed, said coil members are inserted into slots of a core of an dynamo electric machine. Fork-shaped coil members are commonly called "hairpins" in the industry. Other shapes may have an undulated configuration, as described in European publication EP1372242.

The magnetic core in which the coil members are inserted may be, for example, a stator for an electric motor or for an electric generator.

The hairpin normally has two straight legs connected together by a bridge-like transversal part. As a whole, the hairpin somewhat looks like an upside-down "U", with the bridge having a cusp-like shape. Each leg has one free end for inserting the hairpin into the slots of the core. The insertion into the slots is done by passing the free ends of the legs through the longitudinal entrances of the slots and by sliding them past the opposite side of the core, until the legs protrude outwards to a certain extent.

According to the prior art, the hairpin is produced from a conductor having a rectangular or circular cross-section. More in detail, the conductor is cut into straight segments of a predetermined length; each straight segment is bent around a mould to take a temporary "U" configuration.

The temporarily formed legs are then inserted into the slots of two concentric rings, which can rotate relative to each other in opposite directions. With the legs inserted in the rings, a rotation in the opposite direction will subject the hairpin to a definitive deformation, thus giving the hairpin its final configuration, i.e. with the legs spread apart by the pitch required for inserting them into the core slots and with the head deformed accordingly.

In a hairpin production process of common use, after being cut, the straight segment is bent around a first mould to obtain an intermediate hairpin configuration in a plane. The head of the intermediate configuration is then pressed against a second mould to obtain the definitive configuration, wherein the legs are in the correct positions for insertion in the slots. Therefore, this is a process that requires deforming the conductor by pressing it onto suitable moulds.

The apparatuses of common use in the art operate automatically and are not easily adaptable for changes in the geometry of the coil members.

Furthermore, the automatic operations involve pressing the conductor against moulds, and this often places high stresses on the conductor and on the insulation thereof, leading to a high risk of damaging the latter.

OBJECT OF THE INVENTION

It is therefore one object of the invention to manufacture coil members while minimizing the risk that the conductor gets damaged.

It is another object of the invention to produce coil members by using a simplified solution.

It is a further object of the invention to manufacture coil members whose configuration can be changed by means of a programmable solution.

It is yet another object of the invention to manufacture coil members having precisely bent portions, so as to optimize the placement thereof into the spaces available in the cores of dynamo electric machines.

Said objects are achieved by the present invention through an apparatus and a method according to the appended independent claims 1 and 15 for manufacturing a coil member to be inserted into the slots of a core of an electric dynamo machine.

Further preferred and advantageous features of the invention are set out in dependent claims.

BRIEF DESCRIPTION OF THE DRAWINGS

These and other objects and advantages of the invention will become apparent from the following detailed description, which is only provided by way of non-limiting example, with reference to the annexed drawings, wherein:

FIG. 1a shows a detail of a substitutive unit applicable to the solution shown in FIG. 1.

DETAILED DESCRIPTION OF THE INVENTION

Figure 1:
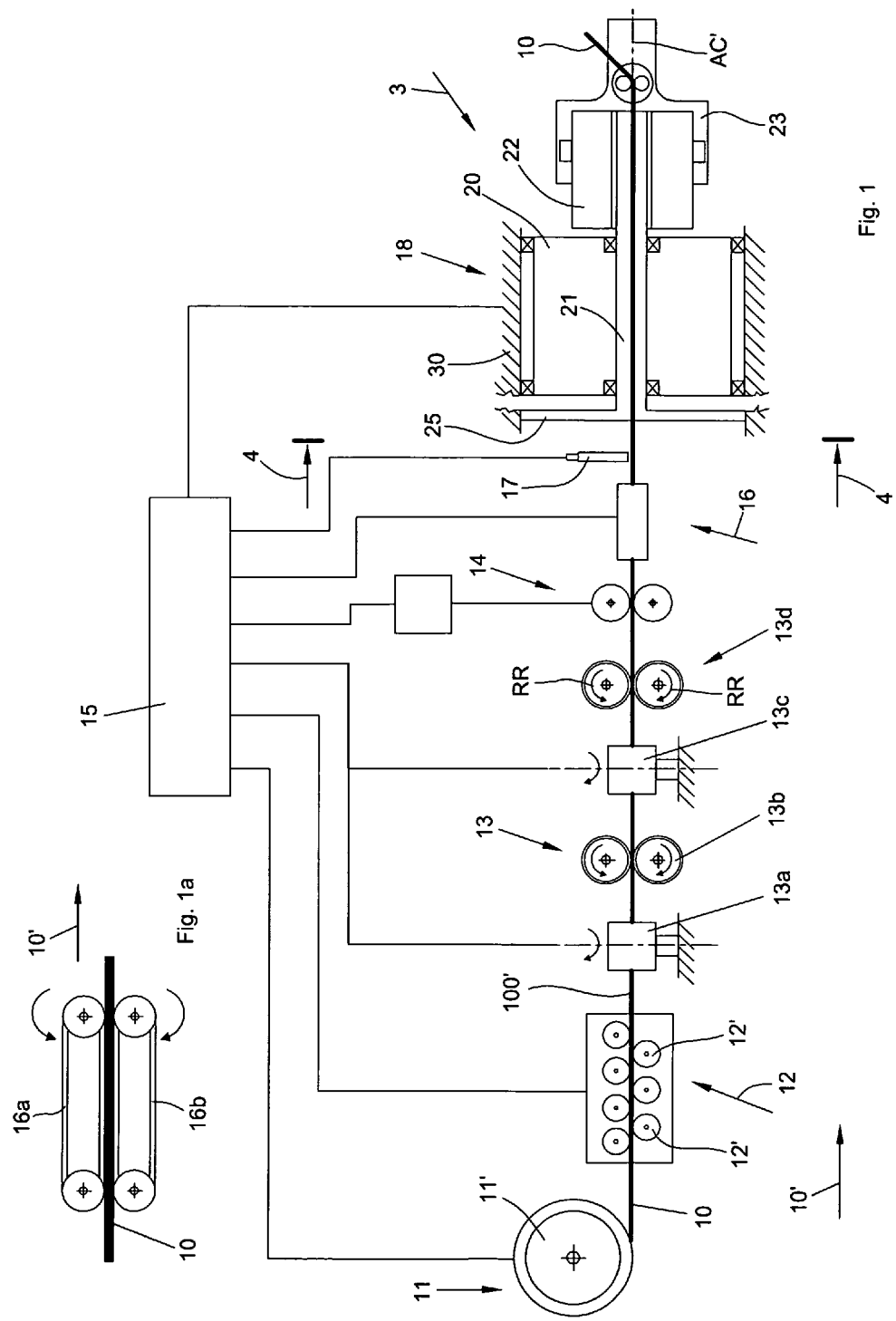
FIG. 1 is a general elevation and schematic view of the apparatus according to the principles of the invention.

With reference to FIG. 1, there is shown the general sequence for manufacturing coil members according to the principles of the invention.

The unit 11 unwinds the conductor 10 from a conductor magazine 11', whereon the conductor was previously wound to form a reserve coil.

The cross-section of the conductor 10 in the magazine 11 may be circular, and unwinding takes place by aligning the longitudinal axis of the conductor 10 with the axis 100' of a feeding path.

The path may be straight, i.e. parallel to the axis 100', with a feeding direction 10', as shown in FIG. 1.

The motion of the conductor 10 along the path, and therefore the feeding of the conductor 10 along the path, may occur through a push/pull action exerted onto the conductor in the unit 16, where motorized belts 16a and 16b press against the conductor in the feeding direction 10, as shown in FIG. 1a. Belts 16a and 16b are able to apply the push/pull action in the feeding direction 10 due to the friction existing between the belts and the conductor.

The unit 13 carries out the transformation of the conductor's cross-section, e.g. from a circular cross-section to a rectangular cross-section (or another cross-section with plane sides).

Upstream of the station 13 there is a station 12 for straightening the conductor 10, where the conductor is forced to slide along the feeding path 100'.

In the station 12, the conductor 10 slides through idle rollers 12', whose surfaces engage the conductor to force it to follow the feeding path.

More in detail, while passing through the rollers 12' the conductor 10 engages those surfaces of the rollers 12' which are arranged laterally and tangential with respect to the feeding path, as shown in the elevation view of FIG. 1. Therefore, the conductor 10 is bent to follow the feeding path.

In the unit 13 there are a series of pairs of rollers 13a,13b,13c,13d. Each roller of one pair is shaped in accordance with the deformation print to be created on one side of the conductor. The print is created by engaging the roller on the side with a certain predetermined pressure. Engagement occurs in a direction transversal to the axis 100' of the feeding path.

The rollers of one pair 13a,13b,13c,13d rotate with respect to each other in a synchronous and opposite manner. Moreover, the rotation of the rollers can be synchronized with the rotation of the belts 16a and 16b through the controller 15.

The transversal pressure applied by the rollers deforms the cross-section of the conductor 10, from circular to rectangular in the case shown in FIG. 1.

More specifically, the roller pairs 13a,13b,13c,13d are mutually arranged at 90°, so that their profiles are oriented according to a succession of deformations in the following order: the conductor's sides are deformed for a first time by the pair 13a; then the conductor's top and bottom are deformed for a first time by the pair 13b; subsequently the conductor's sides are deformed for a second time by the pair 13c; finally, the conductor's top and bottom are deformed for a second time by the pair 13d.

The unit 14 downstream of the unit 13 along the feeding path is capable of providing information useful for measuring the conductor length being fed from the moment when a conductor's cut end passes by the photocell 17 positioned after the unit 14. In fact, the photocell 17 can signal the presence of a cut end of the conductor 10, and can therefore start the counting of the length of the conductor being fed to the bending unit 18. The counting is done by the control system 15, which uses the length passage information transmitted by the measurement wheels in the unit 14 and the count start signal transmitted by the photocell 17.

Figure 2:
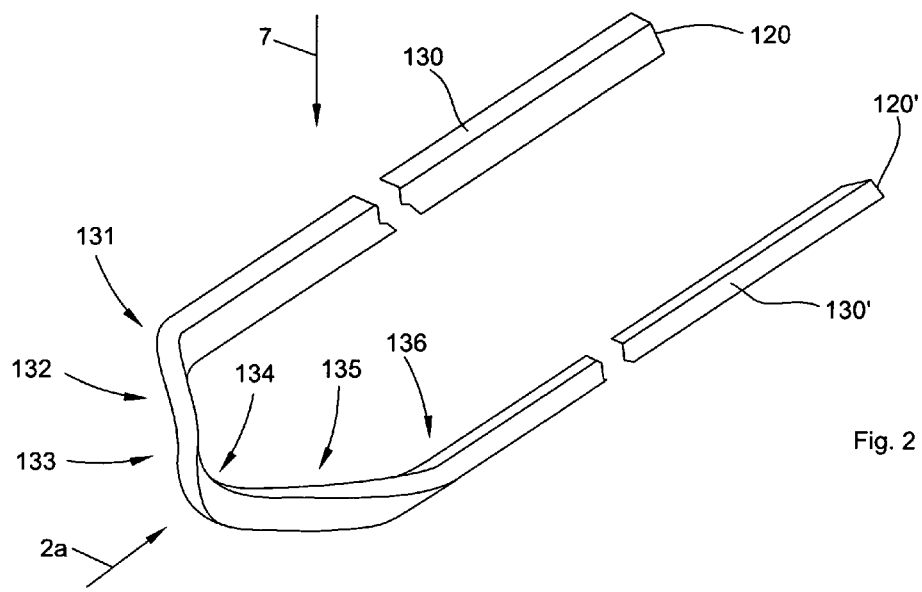
FIG. 2 is a perspective view of one type of coil member manufactured by using the principles of the invention.
Figure 2A:
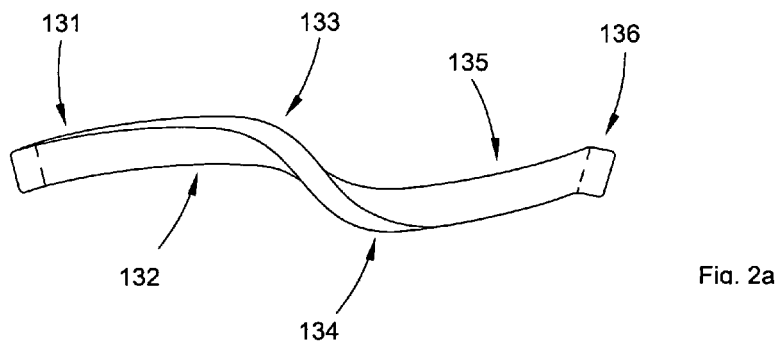
FIG. 2a is a view along the direction 2a of FIG. 2.
Figure 7:
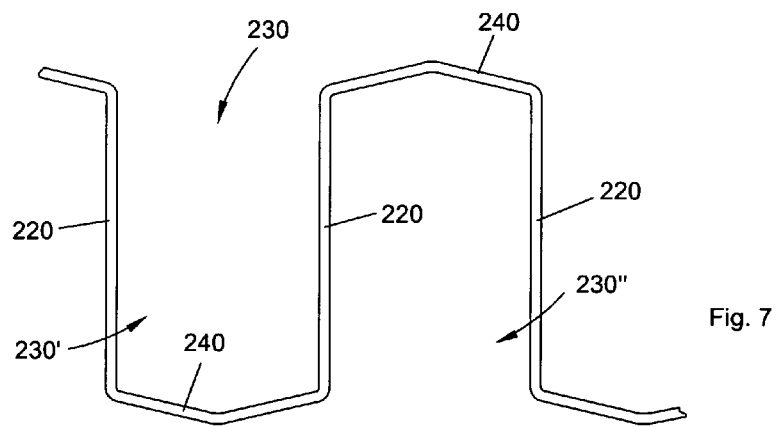
FIG. 7 is a view of a further coil member shape along the direction 7 of FIG. 2.

The bending unit 18 is capable of bending the conductor in order to have it take the desired coil member configuration, e.g. the coil members shown in FIGS. 2 and 7. FIG. 2 shows a hairpin 250 with legs 130 and 130' that will have to be inserted into the slots of a core. FIG. 7 shows an undulated coil 230 that typically constitutes one phase of the core of an dynamo electric machine. The legs 220 of the coil are inserted into the slots of the core, while the heads 240 remain adjacent to the core ends. Each portion 230' and 230" consisting of two legs and one head may have a configuration similar to a hairpin like the one shown in FIG. 2.

Figure 4:
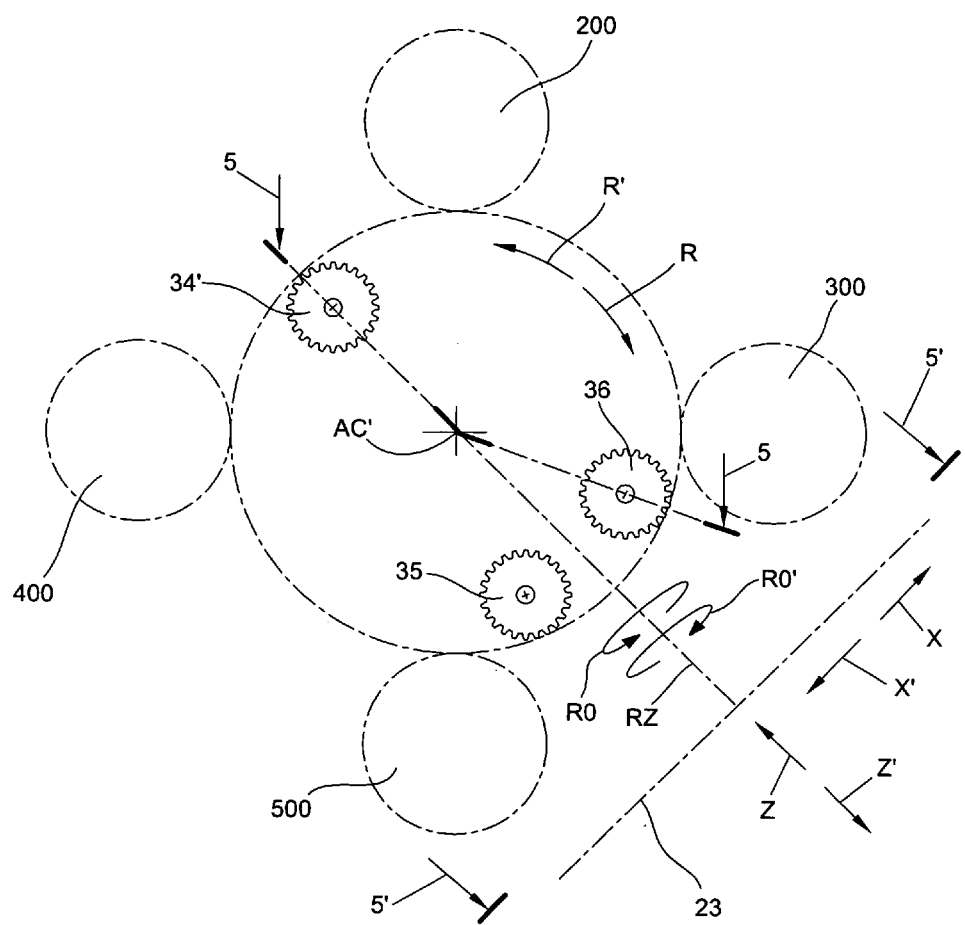
FIG. 4 is a schematic view along the directions 4-4 of FIG. 1.
Figure 5:
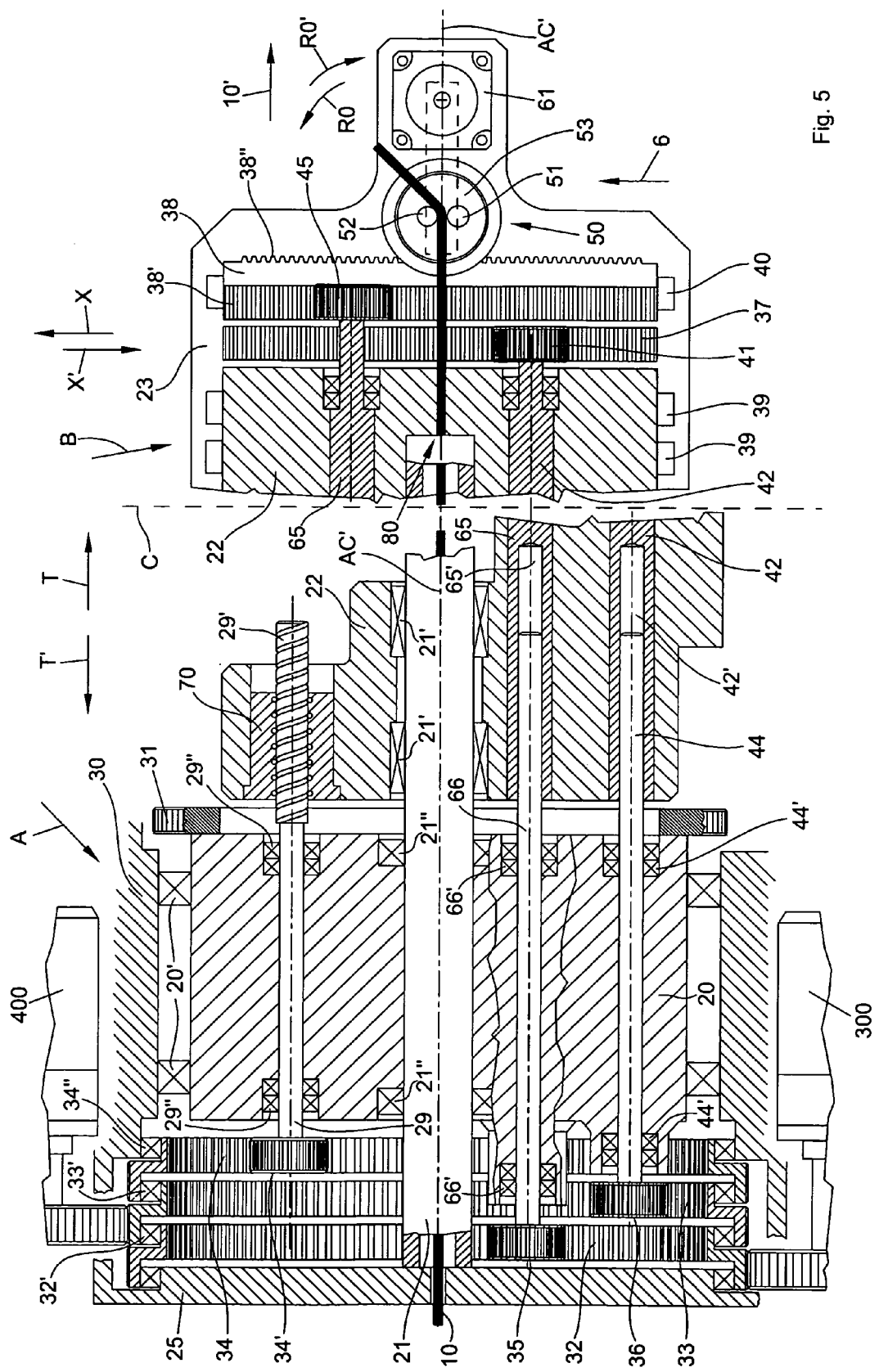
FIG. 5 is a schematic sectional view including a part which is a view along the directions 5-5 of FIG. 4 and a second part which is a view along the directions 5'-5' of FIG. 4.

FIG. 4 shows the directions 5-5 and 5'-5' according to which the cross-sections are viewed, respectively A and B in FIG. 5, demarcated/separated by the reference line C in FIG. 5.

With reference to FIGS. 4 and 5, the bending unit 18 comprises a support member 20, which is cylindrical in shape and includes a central perforated part. The support member 20 is mounted on the bearings 20' of the frame 30 of the bending unit 18, so that the central perforated part is coaxial to the axis AC' of the conductor 10.

The feeding axis AC' is a theoretical reference that can be considered to coincide with the axis of the feeding path 100' of the conductor 10, as shown in FIGS. 1, 3, 4 and 5.

The crown gear 31 is mounted integral with one end of the support member 20, as shown in FIG. 5. The crown gear 31 is turned by the rotations R or R' (see FIG. 4) around the axis AC' by the motor/pinion assembly 500 schematically shown in FIG. 4, and partly also in FIG. 3. As a result, the support member 20 is also turned by the rotations R or R' around the axis AC'.

With reference to FIG. 5, the support member 20 supports the shaft 29 in an eccentric manner on the bearings 29". The shaft 29 carries at one end a screw portion 29' and at the other end a toothed wheel 34' (see also FIG. 4). The toothed wheel 34' meshes with the inner toothing of the crown gear 34 (FIG. 5). The crown gear 34 is mounted on the bearings 34" to be coaxial to the axis AC'. When the crown gear 34 is rotated through the motor/pinion 200 (see FIGS. 3 and 4), the shaft 29 rotates on the bearings 29'" of the support member 20, thus turning the screw portion 29', which is screwed in a threaded sleeve 70 mounted integral with a slide member 22.

The central perforated part of the support member 20 houses the tube 21. The slide bushings 21' are interposed between the tube 21 and the slide member 22. In this way, the slide member 22 is supported by the tube 21 and can move on the bushes 21' in the directions T or T', i.e. parallel to the axis AC' and to the axis 100', with respect to the tube 21 when the screw portion 29' is turned by the motor/pinion 200.

The tube 21 is secured to the frame 30 by means of the fastening plate 25. As shown in FIGS. 1 and 5, the tube 21 passes through the central perforated part of the support member 20 to be joined to the fastening plate 25. The conductor 10 passes inside the tube 21 while being fed in the direction 10', and then comes out through an end nozzle 80 to reach the conductor bending members, which will be described more in detail hereafter.

The bearings 21" are mounted between the support member 20 and the tube 21 to allow the rotations R and R' of the support member 20 around the axis AC' with respect to the tube 21, which is secured to the frame 30 through the plate 25.

A second slide member 23 is adapted to slide on the slide member 22 (see FIGS. 1, 3, 4 and 5). More specifically, the second slide member 23 can move in the directions X and X' with respect to the slide element 22. The directions X and X' may be transversal to the axis AC', more precisely perpendicular to the axis AC'. The motion of the second slide member 23 on the slide member 22 in the directions X and X' is made possible by the guides 39, which are arranged in directions perpendicular to the axis AC' and are mounted between the slide member 22 and the second slide member 23.

The motion in the directions X and X' takes place through the rotation of the gear 41, which meshes with the rack 37 secured to the second slide member 23, as shown in FIG. 5. The gear 41 is secured to the end of the shaft 42, which is adapted to rotate on the slide member 22. The shaft 42 receives the shaft 44 in a bore 42' at its end, as shown in FIG. 5. There is a key connection (not shown) between the shaft 44 and the bore 42', which allows the slide member 22 to translate in the directions T and T' and transmits the necessary rotation to the shaft 42 and hence to the gear 41. The support member 20 supports the extension of the shaft 44 on the bearings 44'. The shaft 44 carries the toothed wheel 36 on its end adjacent to the plate 25. The toothed wheel 36 meshes with the inner toothing of the crown gear 33. The crown gear 33 is mounted on the bearings 33' to be coaxial to the axis AC'. When the crown gear 33 is rotated by the motor/pinion 400 (see FIGS. 3, 4 and 5), the shaft 44 turns on the bearings 44' of the support member 30 and thus rotates the gear 41 to move the second slide member 23 in the directions X and X'.

The member 38 is movable in the directions X and X' on the second slide member 23. The member 38 comprises a first rack portion 38' and a second rack portion 38" (see FIGS. 3 and 5). The member 38 can move in the directions X and X' by sliding on the guide 40 of the second slide member 23.

The motion of the member 38 in the directions X and X' takes place through the rotation of the gear 45, which meshes with the rack portion 38'. The gear 45 is fitted to the end of the shaft 65, which is adapted to rotate on the slide element 22. The shaft 65 receives the shaft 66 in a bore 65' at its end, as shown in FIG. 5. There is a key connection (not shown) between the shaft 66 and the bore 65', which allows the slide element 22 to translate in the directions T and T' while at the same time transmitting the necessary rotation to the shaft 65, and hence to the gear 45. The support member 20 supports the shaft 66 on the bearings 66'. The shaft 66 carries on one end the toothed wheel 35. The toothed wheel 35 meshes with the inner toothing of the crown gear 32. The crown gear 32 is mounted on the bearings 32' to be coaxial to the axis AC'. When the crown wheel 32 is rotated by the motor/pinion 300, the shaft 66 turns on the bearings 66' of the support member 20 and thus rotates the gear 45 to move the member 38 in the directions X and X'.

The conductor bending tool 50 (see FIGS. 3,4,5 and 6) comprises at least one of the pins 51 and 52 integral with the base 53.

Figure 3:
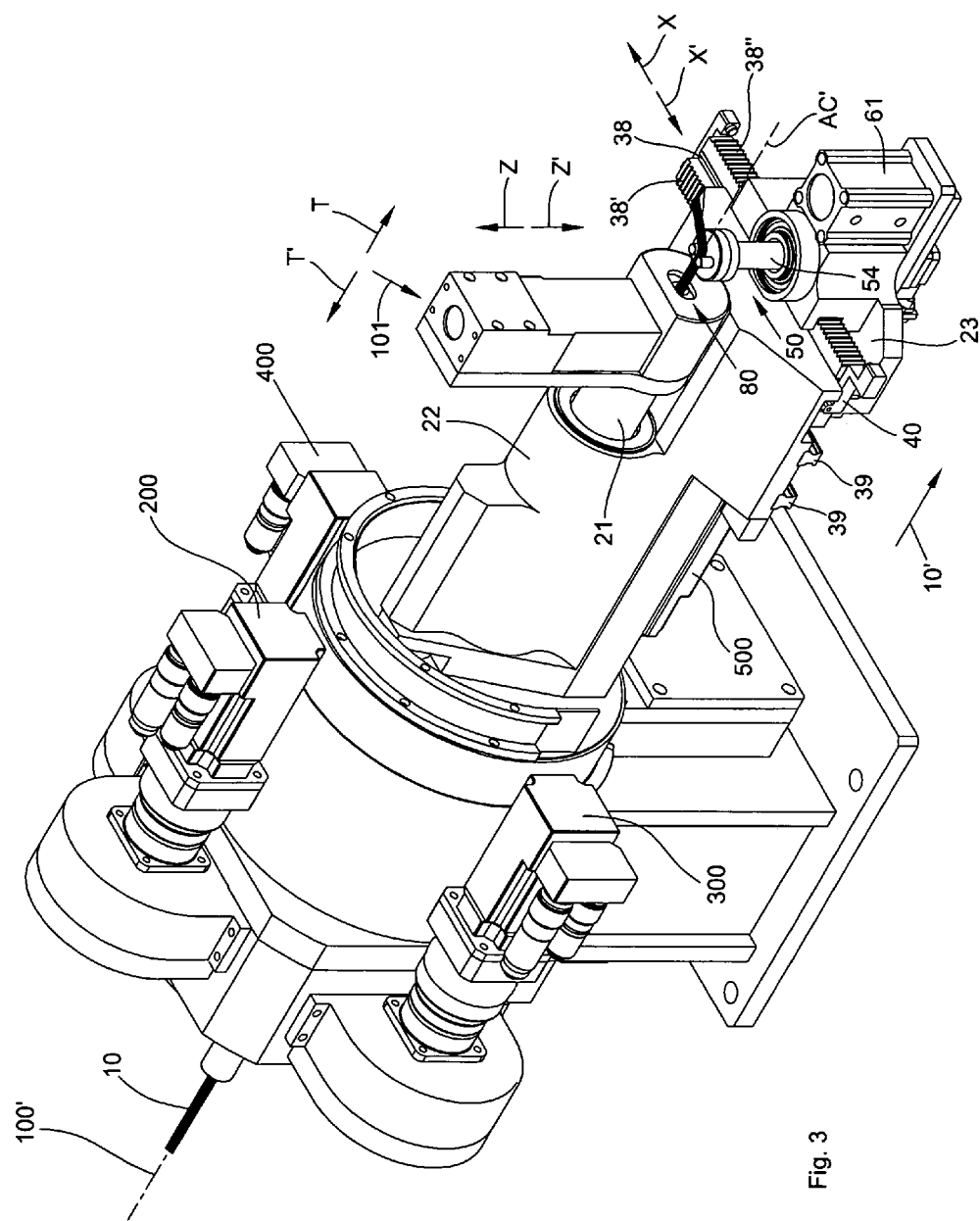
FIG. 3 is a perspective view along the direction 3 of FIG. 1.
Figure 6:
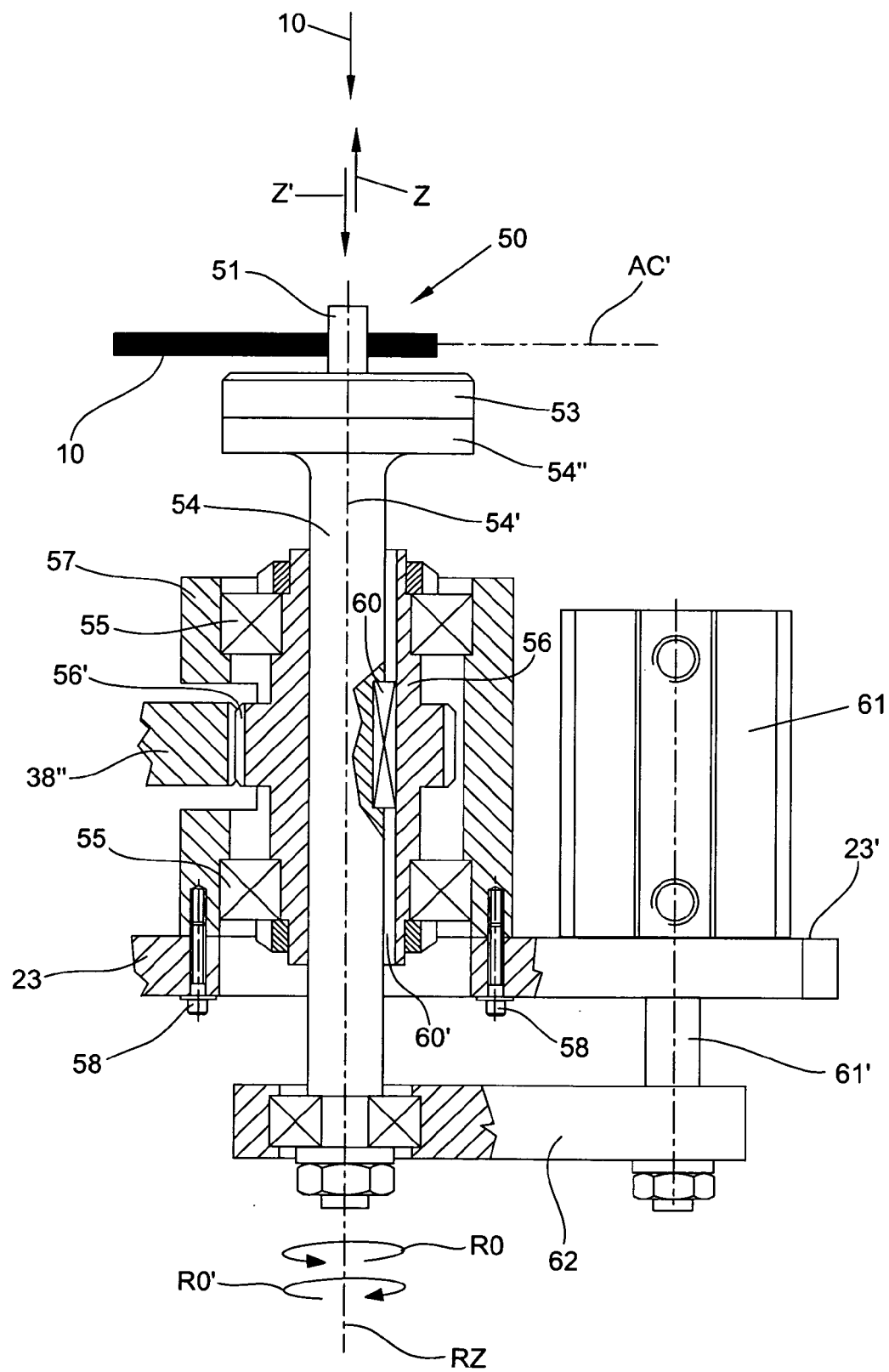
FIG. 6 is a view along the direction 6 of FIG. 5, with a partially sectioned part.

As shown in FIGS. 3, 5 and 6, the pins 51 and 52 are spaced out along a straight line passing through the centre of the base 53. The base 53 is secured by means of screws (not shown) to the upper part 54" of the shaft 54, so that its centre is centred on the axis 54' of the shaft 54 (FIG. 6).

The shaft 54 is slideable in the directions Z and Z' in the central perforated part of the member 56, which is integral with the second slide member 23, and is therefore slideable in the directions Z and Z' with respect to the second slide member 23. The directions Z and Z' are perpendicular to the axis AC', as shown in FIGS. 3, 4 and 6.

The member 56 is supported on the bearings 55 mounted in the support bell 57 (see FIG. 6). The support bell 57 is secured to the second slide member 23 through screws 58. Around the circumference of the member 56 there is a toothing 56' which is concentric to the axis 54'. The toothing 56' meshes with the toothing of the second rack portion 38" of the member 38. The meshing of the toothing of 38" is made possible by a cutout in the support bell 57, which allows the member 38 to approach the member 56, as shown in FIG. 6.

The movements of the member 38 on the second slide member 23 in the directions X and X' as described above cause the shaft 54 to rotate, bringing along the pins 51 and 52 of the rotation RO, or of the opposite rotation RO', on the second slide member 23, i.e. around an axis RZ (see FIGS. 4 and 6).

In fact, the key 60 on the shaft 54 engages a seat 60' in the central perforated part of the member 56. The seat 60' is parallel to the axis 54'. Therefore, rotation is transmitted from the member 56 to the shaft 54, and the shaft 54 is allowed to slide parallel to the axis RZ.

The axis RZ can be considered to be a reference axis perpendicular to the axis AC'. The axis of the shaft 54' is parallel to the axis RZ and can be considered to coincide with the axis 54', as shown in FIG. 6.

The drive cylinder 61 is secured to the surface 23', as shown in FIGS. 3, 5 and 6. The rod 61' of the cylinder 61 is coupled to the arm 62, as shown in FIG. 6. The shaft 54 is also coupled to the arm 62, as shown in FIG. 6.

When the cylinder 61 is actuated, the shaft 54 is therefore moved in the directions Z and Z', parallel to the axis RZ, and as a result also the pins 51 and 52 can move in the directions Z and Z', parallel to the axis RZ.

The movements of the member 38 on the second slide member 23 in the directions X and X' cause the shaft 54 to rotate, bringing along the pins 51 and 52 on the second slide member 23, around the axis RZ on the second slide member 23. Therefore, the pins 51 and 52 are supported on the second slide member 23 to rotate around the axis RZ of the rotations RO and RO'.

The possible movements of the pins 51 and 52 are summarized in FIG. 4, with particular reference to the axis RZ previously defined as perpendicular to the axis AC', which is integral with the second slide member 23 between the pins 51 and 52.

Through movements T and T' of the slide member 22 generated by the motor/pinion 200, the axis RZ translates perpendicular to the plane containing FIG. 4. With the movement T the axis RZ translates towards the observer of FIG. 4, whereas with the movement T' the axis RZ translates away from the observer of FIG. 4. Both movements are parallel to the axis AC'. Consequently, the same translation movements are made by the pins 51 and 52.

Through the movements of the second slide member 23 in the directions X and X' with respect to the slide member 22, generated by the motor/pinion 400, the axis RZ translates transversally to the axis AC'. Consequently, the same translation movement is made by the pins 51 and 52.

Through the rotations of the support member 20 around the feeding axis 100', generated by the motor/pinion 500, the axis RZ rotates around the axis AC' of the opposite rotations R or R', in that the surface 23' rotates in the same manner around the axis AC'. Consequently, the same rotational movement R or R' is made by the pins 51 and 52.

Through the actuation of the cylinder 61, the pins 51 and 52 are moved perpendicularly towards or away from the axis AC'. In this case, the pins 51 and 52 translate parallel to the axis RZ.

Through the movement of the member 38 on the second slide member 23 in the directions X and X', generated by the motor/pinion 300, the pins 51 and 52 perform rotations RO or RO' around the axis RZ.

FIG. 3 shows the cutting assembly 101 assembled on the tube 21 upstream of the nozzle 80. The assembly 101 comprises two cutting blades TG (see FIGS. 8-13), each positioned on a respective side transversal to the conductor 10. A drive device included in the assembly 101 can move both blades TG simultaneously in the direction TG' (see FIG. 8), i.e. transversally to the conductor 10, in order to cut the conductor at a predetermined length defined by the length measurement reference 17 used by the controller 15, thus allowing to release a coil member formed in the bending unit 18.

For clarity and simplicity, in FIG. 5 the assembly 101 has been omitted.

FIGS. 8-13 show some bending operations which can be carried out by implementing the methods and the apparatus of the invention.

Figures 8, 8A:
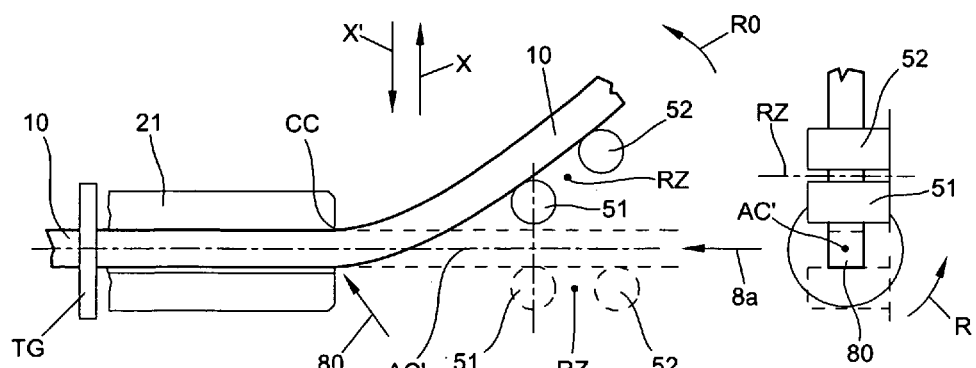
FIG. 8 is a view similar to the view of FIG. 6.
FIG. 8a is a view along the direction 8a of FIG. 8.

With reference to FIGS. 8 and 8a, the pins 51 and 52 are initially in the idle position, indicated by a dashed line. They are therefore on one side of the conductor 10, both aligned with an axis parallel to the axis AC'.

To reach this position, the pins have been rotated by the rotations RO or RO' around the axis RZ, translated in the direction X', and rotated around the axis AC' by a rotation R with respect to the position of FIG. 4.

The bending of FIGS. 8 and 8a creates a gentle curve in the conductor 10 starting from the contact CC at the outlet of the nozzle 80 of the tube 21. Bending and contact are obtained as the pins 51 and 52 move to the position where the pins are drawn with a continuous line.

This bending movement of the pins 51 and 52 is obtained by using a combination of rotation RO around the axis RZ and movement of the pins 51 and 52 in the direction X. During these movements, the pins apply a transversal force onto the conductor 10 in order to bend it as indicated by the continuous line of the conductor 10 in FIGS. 8 and 8a.

Figures 9, 9A:
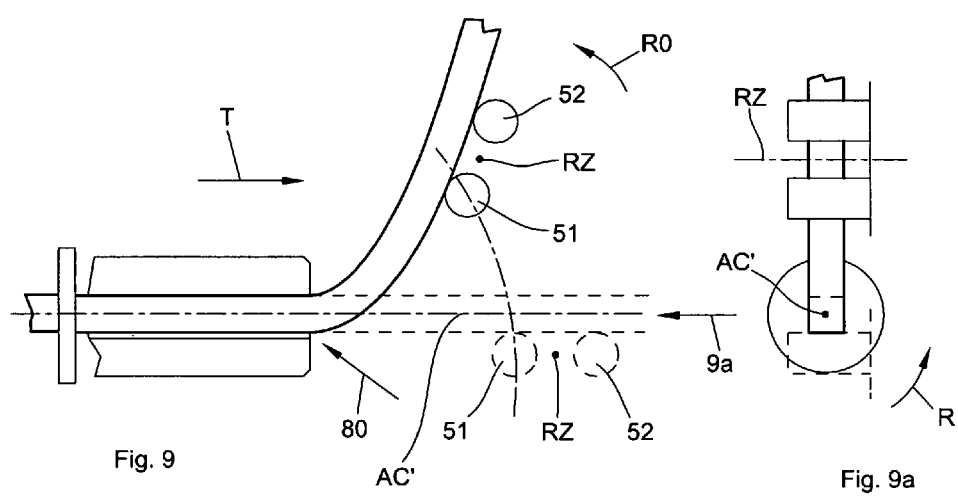
FIG. 9 is a view similar to the view of FIG. 8.
FIG. 9a is a view along the direction 9a of FIG. 9.

The bending shown in FIGS. 9 and 9a can start from a position of the pins 51 and 52 initially similar to the idle position of FIG. 8, the pins 51 and 52 being however closer to the nozzle 80 and hence translated less in the direction T. FIG. 9 shows a sharper curve of the conductor 10, obtained by bending it starting from the contact CC at the outlet of the nozzle 80 as the pins 51 and 52 move to the position drawn with a continuous line. This movement of the pins 51 and 52 is obtained by using a combination of a greater rotation RO (compared to FIG. 8) and a greater movement in the direction X (compared to FIG. 8) of the pins 51 and 52.

Figures 10, 10A:
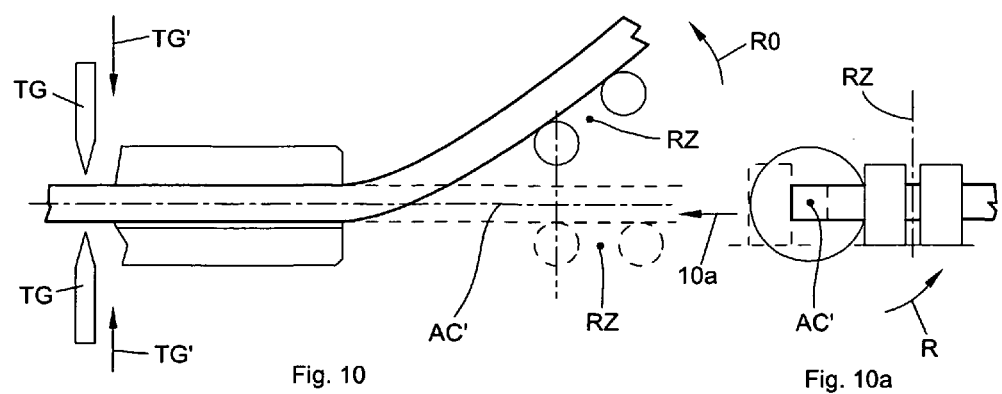
FIG. 10 is a view along the direction 10 of FIG. 6.
FIG. 10a is a view along the direction 10a of FIG. 10.

The bending of FIGS. 10 and 10a occurs in a different plane, e.g. the plane of the view B of FIG. 5, wherein a gentle curve is created in the conductor 10, like the one shown in FIG. 8. The pins 51 and 52 are initially in the idle position, drawn with a dashed line, i.e. on one side of the conductor and both aligned with an axis parallel to the axis AC'. The movements of the pins 51 and 52 required to obtain this bend are similar to those of FIGS. 8 and 8a, i.e. translation in the directions X and rotation RO around the axis RZ, but they take place in different planes, as allowed by the rotation R of the support member 20 (see FIG. 10a).

Figures 11, 11A:
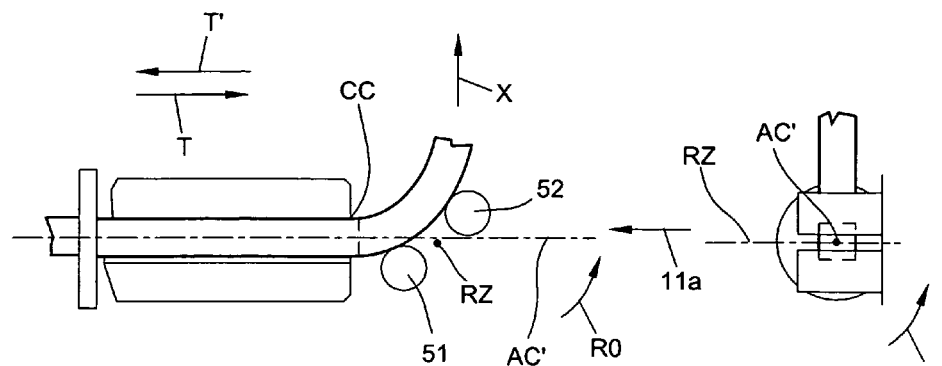
FIG. 11 is a view similar to the view of FIG. 8.
FIG. 11a is a view along the direction 11a of FIG. 11.

The bending of FIGS. 11 and 11a produces in the conductor 10 a curve that practically follows the geometry of an arc of a circle. This bend is obtained by feeding the conductor 10 to first cause it to engage the pin 51, where it is deviated, and then by keeping feeding it to cause it to engage the pin 52 positioned as shown in FIGS. 11 and 11a. This results in a bend created through contact at CC, pressure against the pin 51 and pressure against the pin 52, as shown in FIGS. 11 and 11a.

In summary, the pins 51 and 52 have been translated in the direction T', translated in the direction X, rotated by the rotation RO around the axis RZ, and rotated by the rotation R around the axis AC'.

Figures 12, 12A:
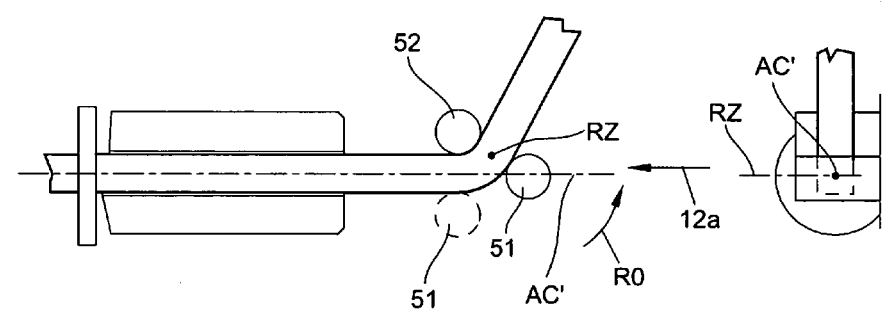
FIG. 12 is a view similar to the view of FIG. 8.
FIG. 12a is a view along the direction 12a of FIG. 12.

The bending shown in FIGS. 12 and 12a produces a very local curve in the conductor 10. The conductor 10 is positioned between the pins 51 and 52, after these have been translated in the direction Z parallel to the axis RZ to be positioned on each side of the conductor (FIGS. 12, 12a). Afterwards the pins 51 and 52 have been rotated by the rotation RO around the axis RZ to obtain the very local curve.

Figures 13, 13A:
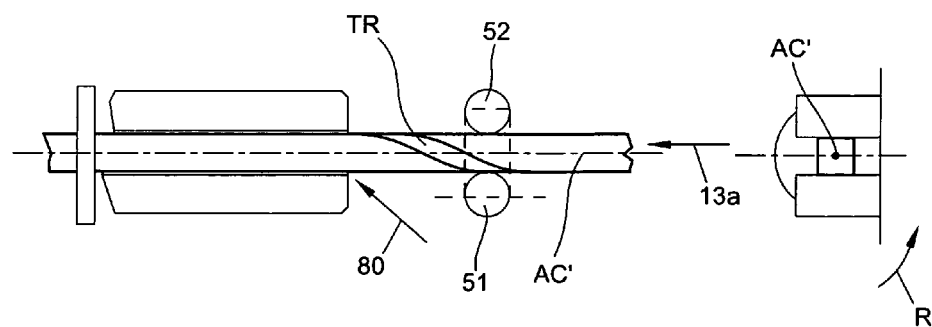
FIG. 13 is a view similar to the view of FIG. 8.
FIG. 13a is a view along the direction 13a of FIG. 13.

The torsion bending of FIGS. 13, 13a requires the pins to approach each other to grip the conductor. In order to provide this gripping action on the conductor 10, a mechanism is added to the solution of FIG. 5. Once the conductor has been gripped, the rotation R around the axis AC' exerts a torsion TR on the conductor as shown in FIG. 13. The counteraction necessary to create the torsion TR is given by the engagement of the conductor 10 with the walls of the nozzle 80.

The coil member of FIG. 2 corresponds to a hairpin manufactured with a rectangular cross-section by the apparatus of FIG. 1 by starting from a circular cross-section conductor stored in the magazine 11. The unit 13 then transforms the conductor's cross-section from circular to rectangular.

The bending unit 18 creates the bend that characterizes the hairpins of FIG. 2 and cuts the ends of the legs 130 and 130'. In fact, the controller 15 will have been programmed to carry out steps like those described in FIGS. 8-13 in order to create in succession the bend portions making up the hairpin and to cut the conductor by means of the unit 101.

For the hairpin of FIG. 2, the succession of bending steps may be as follows: in a first step the straight portion of the leg 130 is fed through the nozzle 80. This first step follows the cutting of the end of the leg 130 that took place at the end of the bending of a previous hairpin, or after the initial cutting of a conductor 10 which was replaced in the magazine 11.

In a second step the bend portion 131 is made, which consists of a curve and a torsion obtained, for example, by applying the principles of FIG. 9 and FIG. 13, respectively.

In a third step the bend portion 132 is made, which consists of a gentler curve obtained, for example, by applying the principles of FIG. 8.

In a fourth step the bend portion 133 is made, which consists of a curve and a torsion obtained, for example, by applying the principles of FIG. 9 and FIG. 13.

The other portions 134, 135, 136 and 130' that complete the hairpin are made in a similar manner through an appropriate combination of the bending operations of FIGS. 8-13 obtained by programming the controller 15 accordingly.

Finally, a robot's manipulator (not shown) may grasp the hairpin to remove the end portion of the leg 130' from the nozzle 80 after the cutting operation has been performed by the unit 101.

As regards the coil member of FIG. 7, the portions 230,230',230" of the coil 230, which have a configuration similar to the hairpin of FIG. 2, can be formed in succession by the unit 18 through a series of bending operations carried out through an appropriate combination of the bending operations of FIGS. 8-13, again obtained by programming the controller 15 accordingly.

In one embodiment of the present invention, the bending tool 50 comprises only one pin 51 or 52 for performing the bending operations described with reference to FIGS. 8-10.

Furthermore, simpler coil configurations may only require a bending obtained through the movement of at least one of the pins 51 and 52 in the direction X and X'; in this case, the solution will be limited to the transmission from the motor 400, i.e. crown gear 33, gear 36, shaft 44, gear 41, rack 37 and guide 39 for the member 23, whereas the members 22 and 23 will be integral with each other without having to mutually rotate or translate.

Other coil configurations may require the addition of the rotation R and R' of the support 20 through the motor 500 and the crown gear 31.

Further configurations may require the addition of the translation T and T' of the member 22 through the motor 200 and the screw portion 29'.

The above description of one specific embodiment has illustrated the invention from a conceptual viewpoint, so that others, by using prior-art techniques, will be able to modify and/or adapt said specific embodiment to various applications without further research and without departing from the inventive concept. It is therefore understood that any such modifications and adaptations will be considered to be equivalent to the exemplary embodiment described herein. The means and materials necessary for implementing the various functions described herein may vary without departing from the scope of the invention. It is understood that the expressions and terminology used herein are merely descriptive and hence non-limiting.

The invention claimed is:

1. A method for manufacturing coil members for insertion in the slots of the core of a dynamo electric machine wherein the coil members are formed by bending portions of an electric conductor, the method comprising the steps of:
   providing an apparatus having an aperture along a feeding axis and a first engagement member;
   feeding portions of conductor of predetermined length through the aperture along the feeding axis according to a feeding direction adjacent to the first engagement member configured to engage the conductor, wherein the aperture is positioned before the first engagement member in the feeding direction;
   moving the first engagement member with respect to the aperture to engage a portion of the conductor with the first engagement member in a transverse direction to the feeding axis to bend the conductor; and
   rotating the first engagement member around the feeding axis to reposition the first engagement member around the conductor.

2. The method of claim 1, further comprising moving the first engagement member for engaging the conductor against a portion of the aperture during bending.

3. The method of claim 1, further comprising moving the first engagement member parallel to the feeding axis to position the first engagement member for bending.

4. The method of claim 1, further comprising rotating the first engagement member around an axis that is perpendicular to the feeding axis.

5. The method of claim 1, wherein the provided apparatus further comprises a second engagement member, the method further comprising feeding the conductor adjacent to the second engagement member configured to engage the conductor, wherein the second engagement member is positioned after the first engagement member in the feeding direction, and engages the conductor transversally with respect to the feeding axis with the second engagement member.

6. The method of claim 5, further comprising rotating the first engagement member and the second engagement member around a rotation axis that is perpendicular to the feeding axis to bend the conductor.

7. The method of claim 1, further comprising moving the first engagement member parallel to an axis that is perpendicular to the feeding axis.

8. The method of claim 1, further comprising gripping the conductor with the first engagement member and the second engagement member and rotating the first engagement member and the second engagement member around the feeding axis to apply torsion to the conductor.

\* \* \* \* \*